United States Patent
Shen

(10) Patent No.: US 9,137,414 B2
(45) Date of Patent: Sep. 15, 2015

(54) DOCUMENT CAMERA BASED MULTIFUNCTION SCANNER-COPIER-PRINTER-FAX WITH AN AUTOMATIC PAPER FEEDER

(75) Inventor: Ji Shen, San Diego, CA (US)

(73) Assignee: Pathway Innovations & Technologies, Inc., San Diego, CA (US)

(*) Notice: Subject to any disclaimer, the term of this patent is extended or adjusted under 35 U.S.C. 154(b) by 198 days.

(21) Appl. No.: 13/635,978

(22) PCT Filed: Mar. 16, 2011

(86) PCT No.: PCT/US2011/028645
§ 371 (c)(1),
(2), (4) Date: Sep. 19, 2012

(87) PCT Pub. No.: WO2011/116077
PCT Pub. Date: Sep. 22, 2011

(65) Prior Publication Data
US 2013/0010321 A1 Jan. 10, 2013

Related U.S. Application Data

(60) Provisional application No. 61/315,904, filed on Mar. 19, 2010, provisional application No. 61/318,129, filed on Mar. 26, 2010.

(51) Int. Cl.
*G06F 3/12* (2006.01)
*H04N 1/195* (2006.01)
(Continued)

(52) U.S. Cl.
CPC ............ *H04N 1/195* (2013.01); *B65H 3/0692* (2013.01); *H04N 1/0057* (2013.01);
(Continued)

(58) Field of Classification Search
CPC ............ H04N 1/0057; H04N 1/00602; H04N 1/00607; H04N 1/00625; H04N 1/00689; H04N 1/00694; H04N 1/00702; H04N 1/195; H04N 1/00495; H04N 1/00535; H04N 2201/0094; H04N 2201/0436
USPC .......... 358/1.1, 1.13, 474, 488, 497, 498, 505
See application file for complete search history.

(56) References Cited

U.S. PATENT DOCUMENTS 4,231,562 A 11/1980 Hori
4,596,385 A 6/1986 Silverberg
(Continued)

FOREIGN PATENT DOCUMENTS

| EP | 0 417 868 | 3/1991 |
|---|---|---|
| EP | 1 427 181 | 6/2004 |
| EP | 1 758 362 | 2/2007 |

OTHER PUBLICATIONS

International Search Report for PCT/US2011/028645 mailed May 12, 2011.
(Continued)

*Primary Examiner* — Gabriel Garcia
(74) *Attorney, Agent, or Firm* — Harness, Dickey & Pierce

(57) ABSTRACT

Disclosed is a document imaging apparatus that includes a housing, which contains a paper storage tray, a digital image sensing device for capturing an image, an adjustable digital image sensing device stand supported by the housing and supporting the digital image sensing device, and a motorized document removal assembly comprising at least one roller wheel picker and a plurality of rollers, wherein the at least one roller wheel picker can be raised and lowered and is configured to apply a frictional force to a top surface of a single sheet of paper and to transfer the single sheet of paper toward the rollers. Optionally, a fax, copier, and printer and be integrated into the document imaging apparatus.

8 Claims, 15 Drawing Sheets

(51) Int. Cl.
*H04N 1/00* (2006.01)
*B65H 3/06* (2006.01)
*H04N 1/04* (2006.01)

(52) U.S. Cl.
CPC ...... *H04N 1/00591* (2013.01); *H04N 1/00602* (2013.01); *H04N 1/00607* (2013.01); *H04N 1/00625* (2013.01); *H04N 1/00689* (2013.01); *H04N 1/00694* (2013.01); *H04N 1/00702* (2013.01); *H04N 1/19594* (2013.01); *H04N 1/00496* (2013.01); *H04N 1/00535* (2013.01); *H04N 2201/0094* (2013.01); *H04N 2201/0436* (2013.01)

(56) References Cited

U.S. PATENT DOCUMENTS

| | | |
|---|---|---|
| 5,078,377 A | 1/1992 | DuBois |
| 5,392,109 A | 2/1995 | Acquaviva |
| 5,488,464 A | 1/1996 | Wenthe et al. |
| 5,764,385 A | 6/1998 | Ohyama |
| 5,805,272 A | 9/1998 | Nozawa et al. |
| 6,580,820 B1 | 6/2003 | Fan |
| 2003/0123107 A1 | 7/2003 | Sheng et al. |
| 2003/0146560 A1 | 8/2003 | Tan |
| 2004/0223048 A1* | 11/2004 | Shiraishi et al. .............. 347/244 |
| 2006/0045379 A1 | 3/2006 | Heaney et al. |
| 2006/0290048 A1 | 12/2006 | Dobashi |
| 2007/0257424 A1 | 11/2007 | Okazaki |
| 2008/0142598 A1 | 6/2008 | Kwan |
| 2008/0316548 A1 | 12/2008 | Yamauchi et al. |
| 2009/0160119 A1 | 6/2009 | Komuro |

OTHER PUBLICATIONS

Extended European Search Report for EP 11756920.2 dated Jul. 29, 2013.

* cited by examiner

Paper Suction Picker with Roller Picker in "UP" Position

DOCUMENT CAMERA BASED MULTIFUNCTION SCANNER-COPIER-PRINTER-FAX WITH AN AUTOMATIC PAPER FEEDER

This application is a non-provisional patent application of and claims the benefit of U.S. provisional patent application No. 61/315,904, which was filed on Mar. 19, 2010, and U.S. provisional patent application No. 61/318,129, which was filed on Mar. 26, 2010, the entire contents of each of which is herein incorporated by reference.

TECHNICAL FIELD

The invention generally relates to the field of document cameras and the field of document scanning apparatuses, and methods for achieving scanning high resolution still images of documents at high speed.

BACKGROUND

In the field of document scanners, it is desirable to be able to scan a document with the highest resolution possible and as fast as possible. Furthermore, when there are multiple pages of documents, it is highly desirable to scan the multiple pages automatically with an automatic paper feeder without manual intervention during the process.

Currently, commercial multifunctional scanner-copier-printer-fax machines typically employ a linear scan head as the primary imaging device before one or multiple copies of the scanned image is printed out as a photo copy, or faxed to a receiving fax machine. In this type of multifunctional machine, document is either placed on a platen scan surface while the scan head moves from one edge of the surface to the other to process scanning of the paper one line at a time until the entire surface is scanned, or when an automatic document feeder is present, a document is rolled pass a stationary scan head which is positioned on the paper path to finish scanning one line at a time with the movement of the paper until the entire surface of the document is scanned.

The main drawback of such a prior art scanning mechanism is that it consumes significant time to finish scanning in a linear fashion. For monochrome color scanning, with scanning resolution of approximately 200 dpi, the current scanning mechanism can take multiple seconds, depending on the paper size and whether the device is consumer grade or professional grade.

For higher resolution scanning such as 300 dpi or 600 dpi scanning, the time to finish a full page scanning can be in tens of seconds. For 32-bit or higher color depth full color scanning, the time to finish a single page scanning can take more than 30 seconds, and depending on whether it is a consumer grade scanner, the time required can go beyond 1 minute for a single page.

Also currently available are some document camera products that are designed and used primarily for the purpose of projecting 3D objects on a larger screen for classroom instructions and product or procedure demonstrations. Traditionally, these document cameras are limited by fairly narrow field of view and shallow depth of field due to the primary application requirement of being able to zoom in on objects with greatly magnified views. The images produced by such document camera devices are often only able to show a portion of a full page document clearly, and requires the document to be held fairly flat in order to capture an image that is not blurred.

Such document cameras are not very suitable for capturing images for documents, and are more suitable for 3D, even though they are called document cameras. Additionally, the traditional application of document cameras normally requires projecting real time video onto large screens. The desire for smoothness of the video projection demands limited per frame image resolution so that the cost of video compression and time of video signal transmission is kept low. Such considerations limit the video image quality for document cameras to less than 100 dpi, which is not high enough for scanning documents with printed small font sized letters and other symbols, requiring at least 200 dpi resolution to be reproduced clearly.

As digital cameras began to be integrated into cell phones, laptop PCs, and other personal computers, optical components and digital sensing component, which have become more and more capable in terms of high resolution, color reproduction, and being highly compact, are becoming more and more common place. The cost for such high quality digital imaging components is also reduced significantly which makes it possible to integrate digital camera devices into more and more electronic products. Revising the imaging components in facing-down document cameras, with resolutions as high as 8, 12, 20, or even 30 mega pixels, for the purpose of document imaging or "scanning" at 300 dpi, 600 dpi, or higher, is not only technically feasible, but also increasingly more cost effective.

Scanners or copier technologies are typically used with an automatic document feeder. Such prior art devices typically have a base frame with a platen glass on top, with originals positioned facing down and above a scanning mechanism. A motor typically drives a scan head beneath the original to capture light reflected off individual linear areas of the original. This is the flatbed scanning module of modern day scanners and copiers. It is common place now for scanners and copiers to have an accompanying automatic document feeder module on top of the flatbed scanning base module. When users feed Multiple pages of paper through the document feeder, an elaborate assembly of mechanical and electrical parts are employed to load paper one sheet at a time, and steadily transport each sheet of paper through a scanning mechanism, which emits a beam of light and captures the reflected light through the beam opening, as the paper rolls through, from the feeder, all the way to the output receiving tray. An example of such prior art can be seen in FIGS. 1 and 2, showing a HP® ScanJet 5590 Digital Flatbed Scanner. Such prior art digital imaging devices encounters certain limitations. In one aspect, such prior art devices are limited in speed of scanning.

Commercially available scanners often publish scan time per line between 0.5 ms to several milliseconds depending on the dpi setting. The time delay to finish scanning a full page document is likely caused by not only the mechanical movement of scan head from line to line, but also the processing time required to compose single line images together into a full page image. This per line scan time coupled with the limitation in paper transport speed through often highly complex and elaborate gear and roller assemblies, in order to ensure paper moves through evenly and steadily while in the meantime avoiding any potential paper clogging inside the assemblies, limits the overall speed greatly. As a result, the vast majority of commercially available scanners are limited to scan no more than 30 pages of monochrome colored paper per minute at 300 dpi resolution. For scanning 32-bit or 48-bit colored paper, the speed drops down significantly, sometimes down to single digit number of pages per minute. When the dpi resolution increases, the scan speed also drops down significantly, sometimes even to the level of less than one page a minute for 600 dpi resolution in consumer grade scanners. High speed professional grade scanners do exist at much higher price than a regular consumer can afford. However, even the professional grade scanners suffer significant speed loss when dpi resolution increases and when scanning with color. In another aspect, such prior art digital imaging devices must employ highly elaborate and complex mechanisms to ensure that paper originals can be loaded properly into the scanning mechanism housing, pulled through the scanning mechanism evenly and steadily so that the captured image is of high quality, and to ensure that paper originals are unloaded properly into a receiving tray when scanning is finished.

Such complex mechanical assemblies are most often not space efficient in either surface dimensions or vertical dimension. Furthermore, the higher the scanning speed requirement, the more complex the mechanism is required to be, and the bulkier such devices tend to become. Also, such prior art imaging devices are not suitable for capturing images of 3D objects not in the form of a sheet of paper, due to the flat glass top and the paper loading mechanism.

When there is the need of scanning multiple paged documents, automatic paper feeding methods or systems are no longer suitable for working with these new document camera-scanner devices. An example of a prior art paper loading apparatus is described in U.S. Pat. No. 5,213,426. If one is to follow the general process of paper loading, transporting, scanning, and then unloading, an automatic paper feeder mechanism has to include a highly sophisticated mechanism to stop a sheet of paper completely while ensuring that it is exposed in full view of the camera-scanner looking down, before a complete image can be captured, and before the paper is removed in an unloading action sequence. Following such traditional design, the resulting mechanical assembly required to work with a document camera-scanner, could be even more complex, elaborate, and bulkier than the automatic paper feeder units included in the prior art devices.

SUMMARY OF THE INVENTION

The disclosed apparatus combines a highly compact high resolution document camera in place of a commonly used linear scan head, with a scanner-copier-printer mechanism, which is most likely but not limited to a laser or inkjet printer. Optionally, the apparatus can be further integrated with a facsimile transmission and receiving device to send and receive faxes, hence becoming a scanner-copier-printer-fax apparatus in one.

The facing-down document camera is capable of capturing digital images of minimum resolution of 2 mega pixels, and reach higher resolutions beyond 20 or 30 mega pixels. The document camera is supported on an adjustable stand that is mounted on the side of a printer encasing with a flat surface on top. The adjustable stand can be further folded and rotated along one side of the printer for portability and space efficiency when not used. The printer unit can be a ready-made printer "engine" re-purposed and enclosed in a custom casing shell to ensure that facing-down document camera, the adjustable camera stand, a control and display panel unit, and the casing shell for the internal printer "engine" all fit into an integrated device.

The facing-down camera can take a snapshot digital image of a document lying on the top surface above the printer unit, which is equivalent to finishing scanning of a full page document, and subsequently transmit the digital image to an internal storage device or a host computer, with a single click action often in less than 100 ms or significantly faster in time. This speed improvement is an improvement over the linear scanning mechanism employed in prior art multifunction scanner-copier-printer-fax devices. This addresses the scanning aspect of the multifunction apparatus.

Once the digital image is captured by the facing-down document camera device, in parallel to the transmission of the image to a permanent storage or a host PC, the captured image is stored in real time access memory and serves as the input image for the printer's driver software and produces a printed copy of the document image. This is the copier function of the multifunction apparatus. The captured digital image can also be forwarded to an optionally integrated facsimile transmission unit which can be connected via a telephone line to send fax out to other regular fax machines. The same facsimile unit can receive incoming fax communications and forward to the printer for printing out. Hence fax functionality is integrated into the apparatus in this fashion.

An optional Automatic Document Handler device can be further integrated into the apparatus to enable automatic batch processing of multiple pages of document placed into the apparatus as a stack of paper. An embodiment of the document imaging apparatus includes a housing that has a paper storage tray for statically retaining a plurality of sheets of paper. A digital image sensing device for capturing a bitmap image is attached to the housing via an adjustable digital image sensing device stand. A document removal apparatus is operable through a suction picker and a plurality of rollers. The suction picker applies a suction force to a top surface of a single sheet of paper on top of the plurality of sheets of paper, raises and removes the single sheet of paper from the stack of paper and transfers the single sheet of paper toward the plurality of rollers. A fan unit within the suction picker creates a vacuum. Alternatively, a pump can be used to create the vacuum.

A variation of the document imaging apparatus is one that includes a paper position sensing unit. A central processing unit is also included to determine a position of the single sheet of paper and to capture an image via the digital image sensing device. To capture an entire image of a page in one pass and to eliminate the need to scan a document line-by-line as has been done in the past, the digital image sensing device includes an infinite length focal lens. To accommodate various sizes and positions of paper, the digital image sensing device is adjustable in three dimensions. Also, if necessary, the digital image sensing device can capture video in real time.

A second embodiment of the document imaging apparatus is one that includes a motorized document removal assembly that has at least one roller wheel picker and a plurality of rollers. The roller wheel picker can be raised and lowered and has a picker wheel that is made of a material that is sticky enough (i.e., a coefficient of friction of 1 or more) so that a roller of the roller wheel picker can apply a frictional force to a top sheet of the paper and thereby remove the top sheet of paper from the stack. The material of the picker wheel can be, for example, any type of rubber such as silicone or acrylic. The roller wheel picker is capable of transferring the top sheet of paper toward a plurality of rollers that are positioned to cause the top sheet of paper to exit the document imaging apparatus. The components of the present embodiment are housed in a housing that contains a paper storage tray and that supports an adjustable digital image sensing device stand, which supports the digital image sensing device. Through the adjustable digital image sensing device stand, the digital image sensing device is adjustable in three dimensions.

This embodiment of the document imaging apparatus also includes a central processing unit that can work along with a paper position sensing unit and thereby determine a position of the top sheet of paper and to capture an image via the digital image sensing device. Any of the embodiments disclosed herein can include a digital image sensing device that comprises an infinite length focal lens and that can be configured to capture or create a real-time video stream.

Another embodiment is a document imaging apparatus that can scan an entire document with a single scan. In other words, line-by-line scanning, as is done in existing systems, is not required. This embodiment includes a housing that supports an adjustable swing arm unit and a document camera scanner unit that is housed within the swing arm unit.

Other features of the disclosed embodiments can be added to this embodiment (similarly, features of any embodiment disclosed herein can be mixed and matched with any other embodiment). For example, the present embodiment can be used with a digital image sensing device having an infinite length focal lens and that can be configured to capture a real-time video stream. Also, this embodiment can include any of the above described document removal assemblies, position sensing units and central processing units. This embodiment also includes lighting accessories that enable the document image sensing device to attain a clearer image of the document being imaged. Use of the lighting accessories is not limited to this embodiment. The lighting accessories can be used in any of the embodiments disclosed herein.

Yet another embodiment, the present invention includes a display panel, which is significantly bigger than commonly used display panels used in most multifunction scanner-copier-printer-fax devices. The display can be pulled out or retracted into a slot on the top part of the apparatus. A larger screen allows users preview image or a realtime video effectively on the display. The electronic components of the apparatus can include Micro Controller Units (MCU) or other types of full function system centered around a Central Processing Unit (CPU), on which an Operating System (OS) can run. In a preferred embodiment, the apparatus can include a full functioned OS such a condensed Linux kernel, Google Android, or other small footprint OS. Such OS embedding within the apparatus can allow for connectivity between the apparatus and another host computer, or with other computers on an IP network, through networking functionalities supported by the OS. Electronic mail software and other software programs which can transmit data over TCP/IP networks can execute within such an environment. Digital images captured by the document camera unit can be stored and managed locally, and can be also transmitted via email, uploaded to web sites, or any other utility that can transport image files over IP networks. There are numerous online electronic faxing service establishments over IP networks. Once the apparatus is connected to an IP network, users can link directly with any online electronic faxing service of their choice to send and receive faxes digitally. Such functionality can be considered as the apparatus being a virtual fax machine.

By combining a facing-down high resolution document camera with a printer device and an optional facsimile machine unit, linear scanning mechanisms in commercially available multifunction machines, which are limited by the linear scanning speed, are virtually replaced. A new type of high speed, high resolution scanner-copier-printer-fax, all in one machine is enabled.

DESCRIPTION OF THE ACCOMPANYING FIGURES

FIG. 3b is a closer view of the components of the embodiment shown in FIG. 3a;

DETAILED DESCRIPTION OF THE EMBODIMENTS

Figure 1:
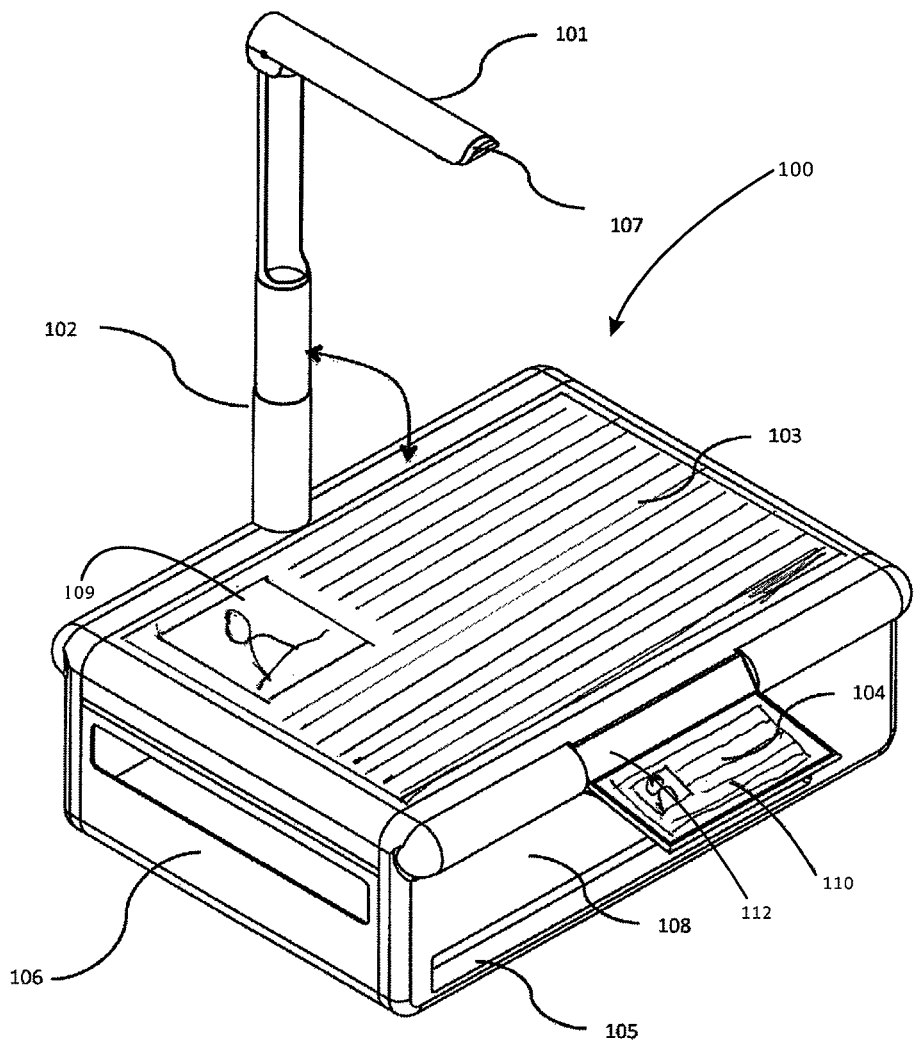
FIG. 1 is an illustrative example of a document camera device.

FIG. 1 is a perspective view of a disclosed apparatus 100, which combines a facing-down document camera 107 (alternatively referred to herein as a "document camera-scanner unit" or "DCSU") with a printer that has a printer top cover 103 on which documents are scanned. The DCSU 107 has a field of view of the entire top surface area of the printer top cover 103. DCSU 107 is enclosed in a swing arm unit (SAU) 101, which is connected to and can rotate on the top of a Document Camera Stand 102. When the swing arm unit 101 is rotated down in a folded position, the document camera stand 102 structure can be rotated at its base clockwise to be in a fully folded configuration toward the printer so that the apparatus as a whole is space efficient, making it easier for storage when not in use, and more portable.

The document camera stand 102 is motorized to move up or down in a telescoping motion to move the document camera-scanner unit 107 closer to or further from a paper document or 3-dimensional object 109 that is placed on the printer top cover 103. Such mechanical telescoping motion is equivalent to zooming in or zooming out in optical engineering teinis. At the document camera-scanner unit 107's maximum imaging resolution, moving the document camera-scanner-unit 107 physically closer to the object 109, ensures that object images can be captured at the highest dots per inch (dpi) or pixel per inch (ppi) measure. The DCSU 107 has a minimum resolution of 2 mega pixels, and can reach 30 mega pixels. The image capture is executed with a single click input from a User Interface implemented on a Retractable display screen and central control Unit (hereinafter alternatively referred to as "DSC-CCU") 104. The time it takes to complete the capture is significantly below 100 milliseconds.

Once a digital image of the object 109 is captured, it will be displayed as a preview picture as a live video stream or a still image shown as an object picture 110 displayed on a sufficiently sized display screen and central control 104. The display screen and central control 104 can initiate a transfer of the captured object picture 110 electronically through a printer driver to an integrated printer unit (alternatively referred to hereinafter as "IPU") 108. There can be numerous implementations of printer units such as laser, inkjet, or other types of printers. Upon receiving electronic data of the object picture 110, and control instruction from the display screen and central object picture 104, integrated printer unit 108 prints one or more copies of the object picture 110, which realizes the copier function of the apparatus.

The display screen and central control unit 104 can be pulled out or retracted into a slot on the top part of the apparatus 100. A larger screen allows users to preview an image or a real-time video on the display. The electronic components of the apparatus 100 can include Micro Controller Units or other types of full function systems centered around a central processing unit, on which an operating system can run. In some embodiments, the apparatus includes a full functioned operating system such a condensed Linux kernel, Google Android, or other small footprint operating system. Such operating systems embedded within the apparatus can allow for connectivity between the apparatus and another host computer, or with other computers on an IP network, through networking functionalities supported by the operating system.

Also shown in FIG. 1 is a Printer Paper Loading Tray (PPLT) 106, where blank paper for the integrated printer unit 108 can be placed before being loaded into the integrated printer unit 108 for printing. Paper exit tray 105 is at the bottom part of the apparatus 100 where printed documents are deposited.

Figure 2:
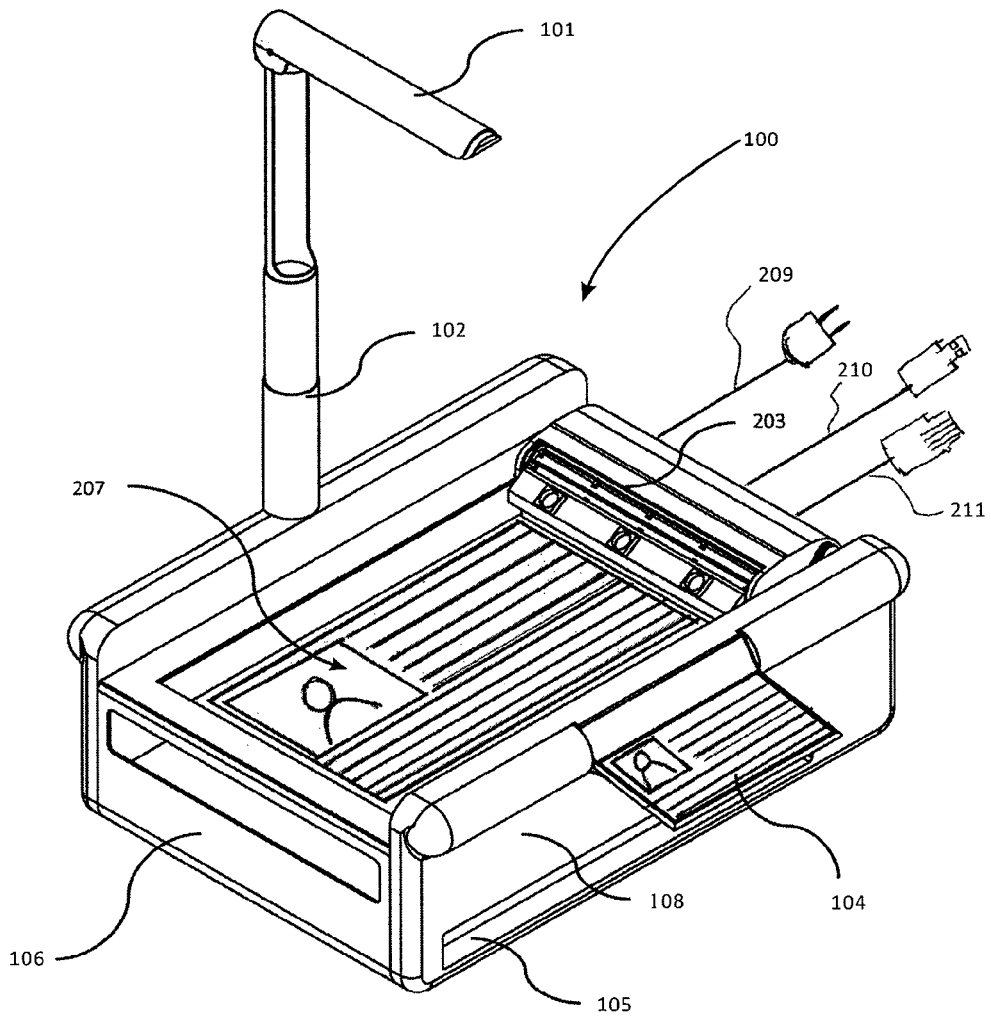
FIG. 2 is perspective view of the document camera device with optional functional components.

FIG. 2 is a perspective view of an embodiment 100 that integrates optional functional components into the apparatus 100. A motorized paper unloading assembly 203 is located on the apparatus and is responsible for picking up a top sheet of paper and removing it to the outside of the enclosure structure of the apparatus. A static paper tray unit 207 is located in the middle and main section of the apparatus 100, and should be operated with an open top. A top cover is optional which allows for placing 3D or 2D objects on the cover to be photographed. The top cover is provided to serve as a surface on which to place objects. In this way, an object will not have to rest directly on the stack of paper or static paper tray unit 207, thereby avoiding damage to each. The document camera-scanner unit 107 captures a digital image of the top sheet of paper on the paper stack placed inside the static paper tray unit 207 in a single snapshot motion. This image capture motion is completed in the same way for capturing an image for a single sheet of paper on the top cover of a printer base unit enclosure as illustrated in FIG. 1.

Immediately following completion of capturing the image of the top sheet of paper, the motorized paper unloading assembly 203 is responsible for moving in on top of the paper stack, lifting up and removing the top sheet of paper away from the static paper tray unit 207 and transporting the top sheet of paper to the outside of the apparatus' overall enclosure, by employing a suction picker mechanism combined with rollers with high friction coefficient. Such motion of the motorized paper unloading assembly 203 temporarily obstructs the field of view of the DSCU 107, and the motorized paper unloading assembly 203 quickly retreats back to its position outside of the field of view of the DSCU 107. As soon as the motorized paper unloading assembly 203 completes the removal of the top sheet of paper from the static paper tray unit 207, it signals the DSC-CCU 104 to initiate another snapshot image capturing of the next sheet of paper now on the top of the paper stack. Such picture capturing and removal of the top sheet of paper repeats until all sheets of paper on the stack are digitally photographed and emptied from the static paper tray unit 207. The above mentioned devices and methods fulfill the function of combining an automatic document handler with the apparatus 100.

Figure 3A:
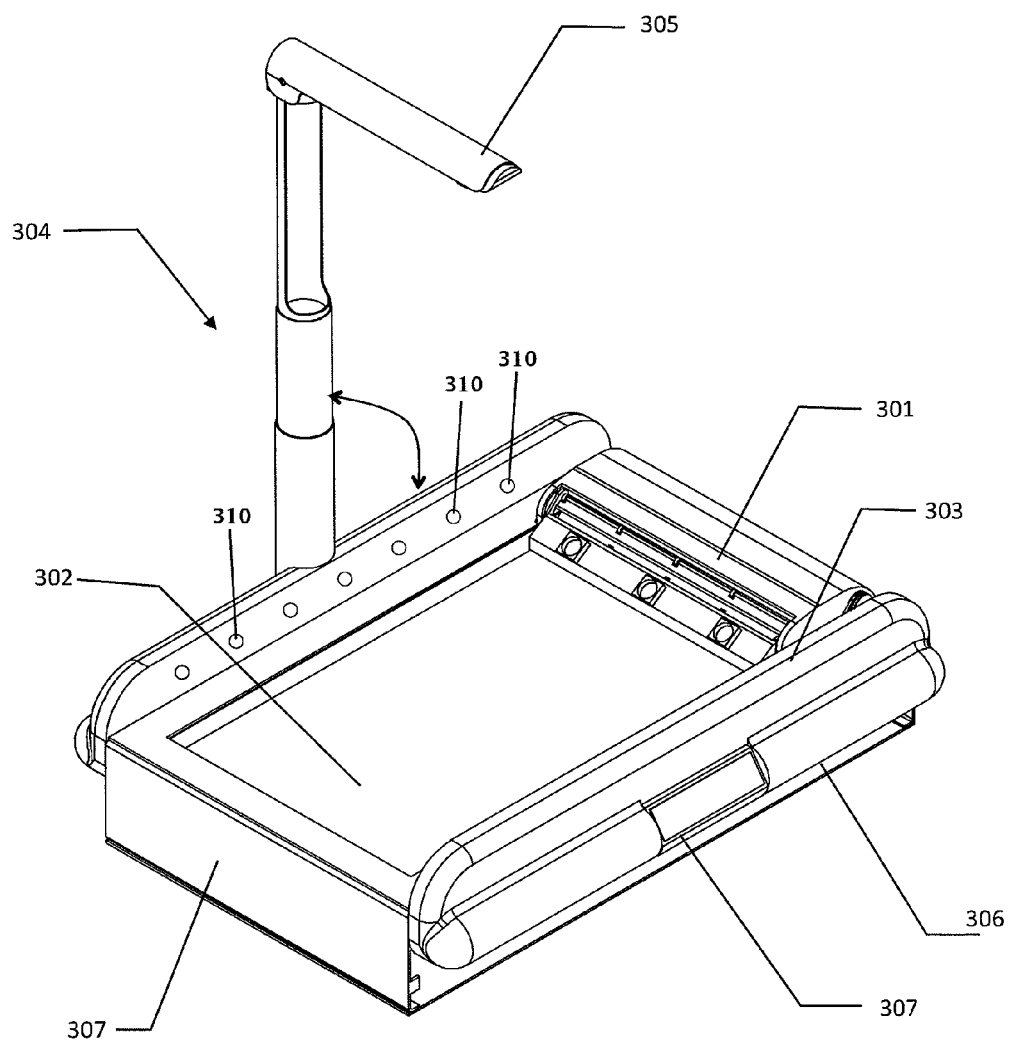
FIG. 3a is a perspective view of another embodiment of the multi-function apparatus.

The roller and gear assembly MPUA for removing one sheet of paper at a time can be achieved in the embodiment illustrated by 301 in FIG. 3a. FIG. 3a is a perspective view of another embodiment of the multi-function apparatus. A motorized paper unloading assembly (MPUA) 301 is located on the right end of the apparatus, which is responsible for picking up the top sheet of paper and removing it out to the Receiving Tray Unit (RTU) 306. An outer shell unit (OSU) 303 functions as the apparatus's housing and supporting all parts that comprise the whole apparatus. Electronic printed-circuit board units are located inside the OSU 303 and under a display panel of a central control unit (CCU) 307. The electronic units control the entire sequence of motions to move the DSCU, trigger paper picking actions as soon as an image is captured, removes the top sheet paper to a receiving tray unit 306, and repeats the image capturing for the next sheet of paper until the entire stack of paper is digitally photographed and removed from the SPTU 302. A Swing Arm Unit (SAU) 305 houses the camera lens, image sensor, and the digital imaging unit inside. When fully extended, the SAU 305 can be moved along side the OSU 303 to a predetermined position either closer to or farther from the MPUA 301 to center its location when paper size is adjusted. The DSCU 304 also adjusts its height to predetermined positions according to different paper sizes through a telescoping motion. The ability of adjust the position of the DSCU 304 both vertically and laterally, makes it possible for the system to capture digital images or "scan" documents of variable sizes. Lighting accessories 310 can be built into the side wall of the SPTU 302 to ensure good lighting conditions to achieve the optimal quality in color and clarity reproduction in captured digital images.

Figure 3B:
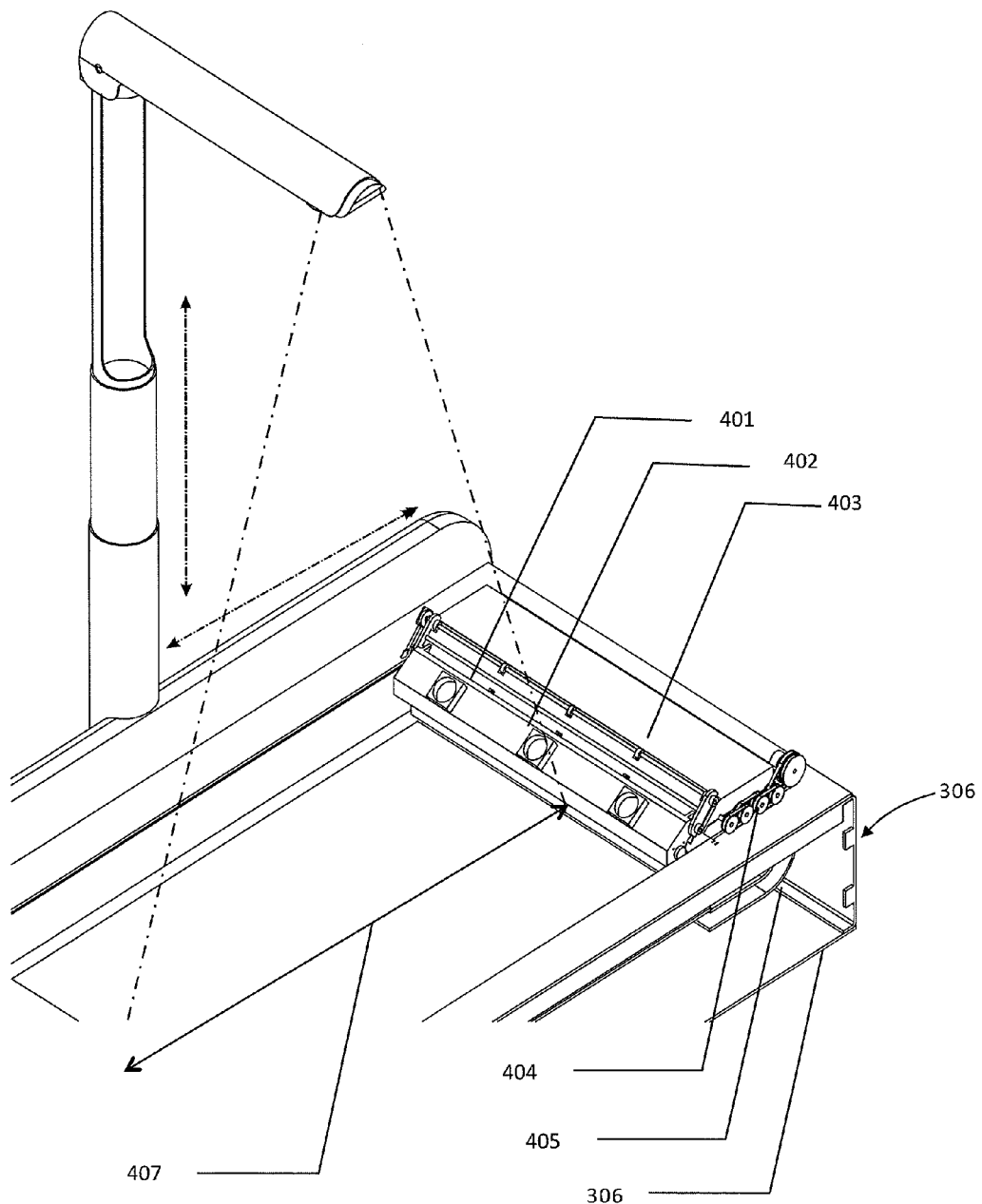

FIG. 3b is a closer view of the embodiment shown in FIG. 3a with a partial section view of the outer shell unit 303, within the same preferred embodiment as shown in FIG. 3. The MPUA 301 is comprised of at least one Suction Fan 401 whose turning creates a vacuum and suction force in the suction picker unit (SPU) 402, a suction picker mover (SPM) 403, a set of paper remover rollers (PRR) 404, and a finished paper chute (FPC) 405. The field of view for the facing-down camera unit housed inside the swing arm unit 305 is illustrated by 407. Initially, when a stack of paper is placed into the static paper tray unit 302, the camera unit has an unobstructed field of view covering the entire surface area of the top sheet of the paper stack, while all the parts of the MPUA being outside of the field of view 407. As soon as a digital photograph of the top sheet of paper is captured, the DSCU 304 sends a signal to the central control unit 307, which will in turn signals the motorized paper unloading assembly 301 to initiate the paper removal motions. Once initiated, the suction picker mover 403 moves the suction picker unit 402 on top of the paper stack, then lowers the suction picker unit 402 close to the paper, with the Suction Fan(s) 401 running which creates the air suction force against the top sheet of paper on the stack (alternatively, a pump can be used to create the vacuum). The suction picker mover 403 then immediately moves the suction picker unit 402 upward to lift up the top sheet of paper, followed by a swift lateral movement toward the paper removal rollers 404. At this point, the suction picker remover 403 is moved back to its original standby position, and has then removed itself from obstructing the Field of View 407. Once paper is engaged with paper removal rollers 404, it is quickly guided and pulled through the belts enclosing the paper removal rollers 404, traveling through the finished paper chute 405, and being transported into the receiving tray unit 406.

Figure 4A:
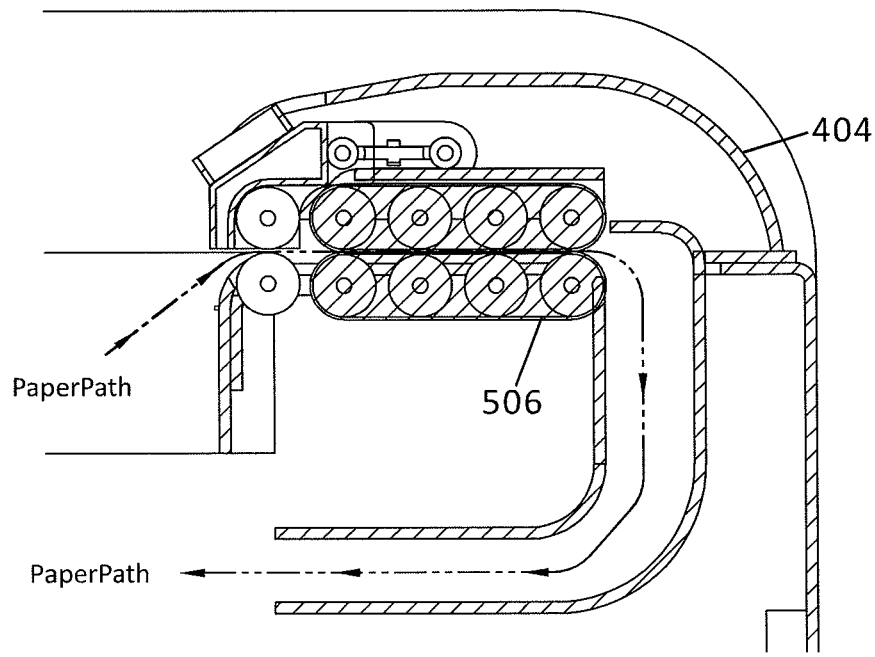
FIG. 4a shows details of a motorized suction picker housing in an raised position.
Figure 4B:
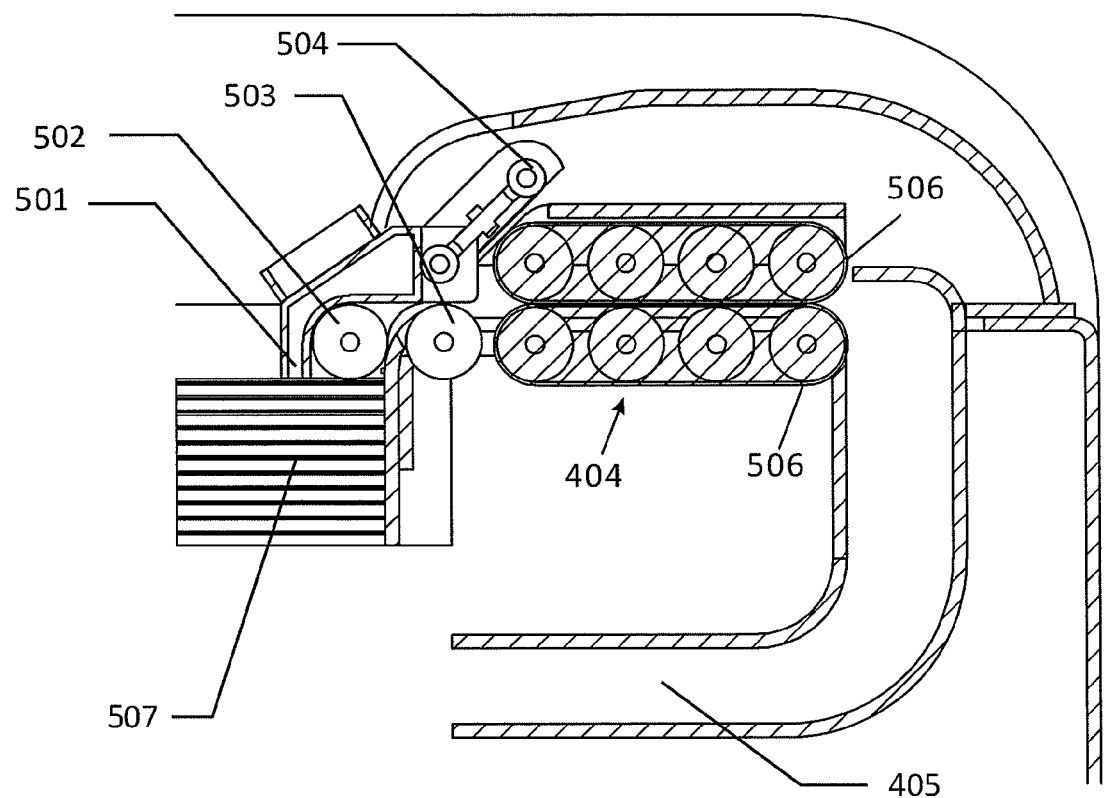
FIG. 4b shows details of the motorized suction picker housing in a lowered position.

FIGS. 4a and 4b show further detail of the MPUA 301 in a section view. FIG. 4a shows the path a sheet of paper follows from the point it is picked up, to being captured by paper removal rollers 406, guided through the finished paper chute 405, and eventually reaching the receiving tray unit at the bottom of the apparatus. In FIG. 4b, 507 is the paper stack to be "scanned" by the apparatus; Suction Nozzle (SN) 501 makes direct contact with the top sheet of paper on the paper stack 507, and lifts up the first sheet by the suction force created by the suction fan 401. Once a number of sheets on the top of the stack are removed, the paper stack can be moved higher through a controlled or spring loaded mechanism. Such a design ensures that only the top sheet of paper is lifted with virtually no possibility of lifting and removing more than one sheet of paper at a time from the Paper Stack 507. In FIG. 4b, suction nozzle 501 and suction nozzle roller (SNR) 502 are in a "DOWN" position to make direct contact and to exert suction force on the top sheet of paper. In FIG. 4a, the SN 501 and the suction nozzle roller 502 are lifted in a vertical motion first, by the motorized mover system (MMS) 504, and followed by a lateral motion also actuated by MMS 504, which moves the lifted top sheet of paper to be secured in between the suction nozzle roller 502 and a paper alignment roller 503. The rotation motion of suction nozzle roller 502 and PAR 503, guides the paper sheet toward the paper removal rollers 404, which are enclosed in a pair of Motorized Paper Mover Belts (MPMB) 506. Once the paper sheet reaches and engages the motorized paper mover belts 506, it will be further guided through to pass through a smooth and curved are in the FPC 405. The paper sheet eventually reaches the RTU 306. The above mentioned process of unloading the top sheet of paper is only limited in speed by the lowering motion, which is similar to a cat claw down swing motion, and the up-lifting motion of the SN 501, SNR 502, created by the MMS 504. As long as this paper sheet capturing and removal motion is executed expeditiously, there is virtually no other complex paper controlling mechanism necessary in the subsequent actions to transport the paper sheet to its final destination in the RTU 306. Hence, the end result of this embodiment is that the apparatus can remove a stack of paper at very high speed. Additionally, the elimination of complex and prolonged paper sheet transportation within the apparatus makes it possible for the embodiment to avoid frequent paper jams or other possible errors. The employment of suction force ensures that the second or other sheets of paper further down the paper stack 507 are not removed together with the top sheet undesirably.

Figure 5:
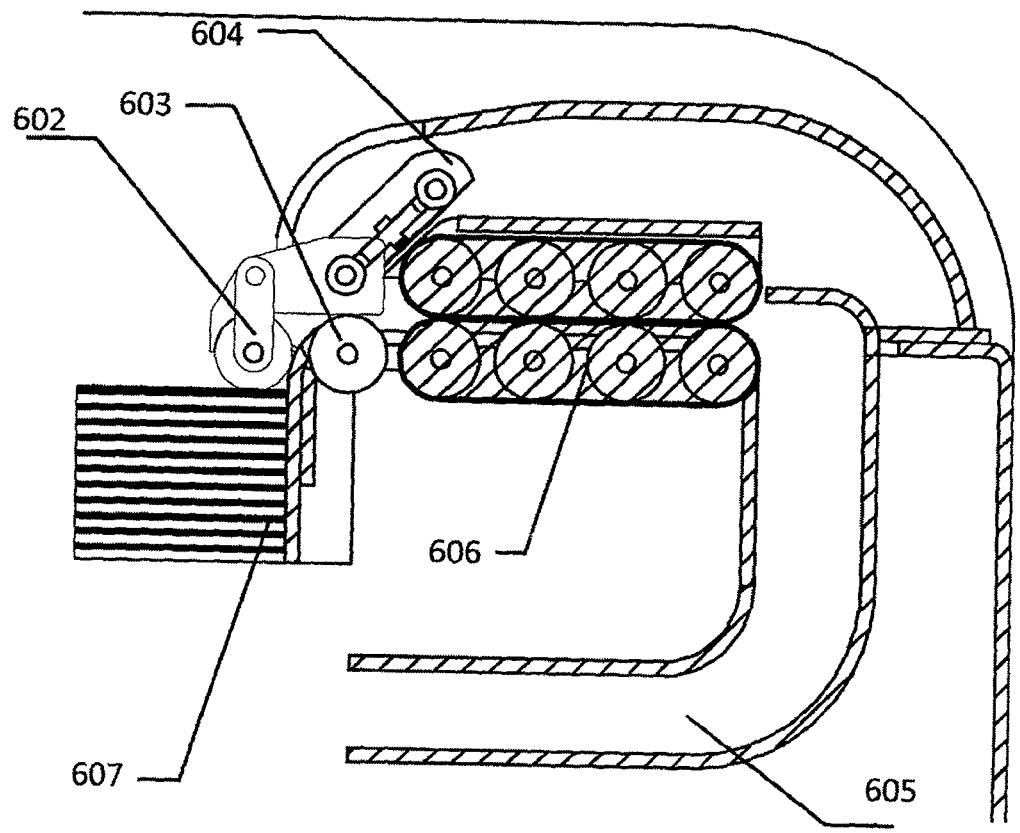
FIG. 5 shows details of the motorized roller paper picker housing.

In the embodiment shown in FIG. 5, the Suction Nuzzle 501 and the suction nozzle remover 502 are replaced by a motorized roller assembly, which follows a similar down swing motion as the suction nozzle remover 502, but employs only a roller to pick up the top sheet of paper. The surface material of the roller reaching down to contact the paper, is made of specialized rubber material, which has significantly high friction coefficient (i.e., a coefficient of friction of about 1 or more) in order to move the top sheet of paper with friction without pulling the second sheet of paper or the sheets further below. In this embodiment, element 602 is the paper picker roller, element 603 is the paper alignment roller, element 604 is the motorized mover system, element 606 is the paper remover roller and belt unit (PRRBU), element 607 is the paper stack, and element 605 is the finished paper chute (FPC). The other parts in the MPUA 301 remain similar to the embodiment using the suction nozzle. The material of the picker wheel can be, for example, any type of rubber such as silicone or acrylic.

Figure 6:
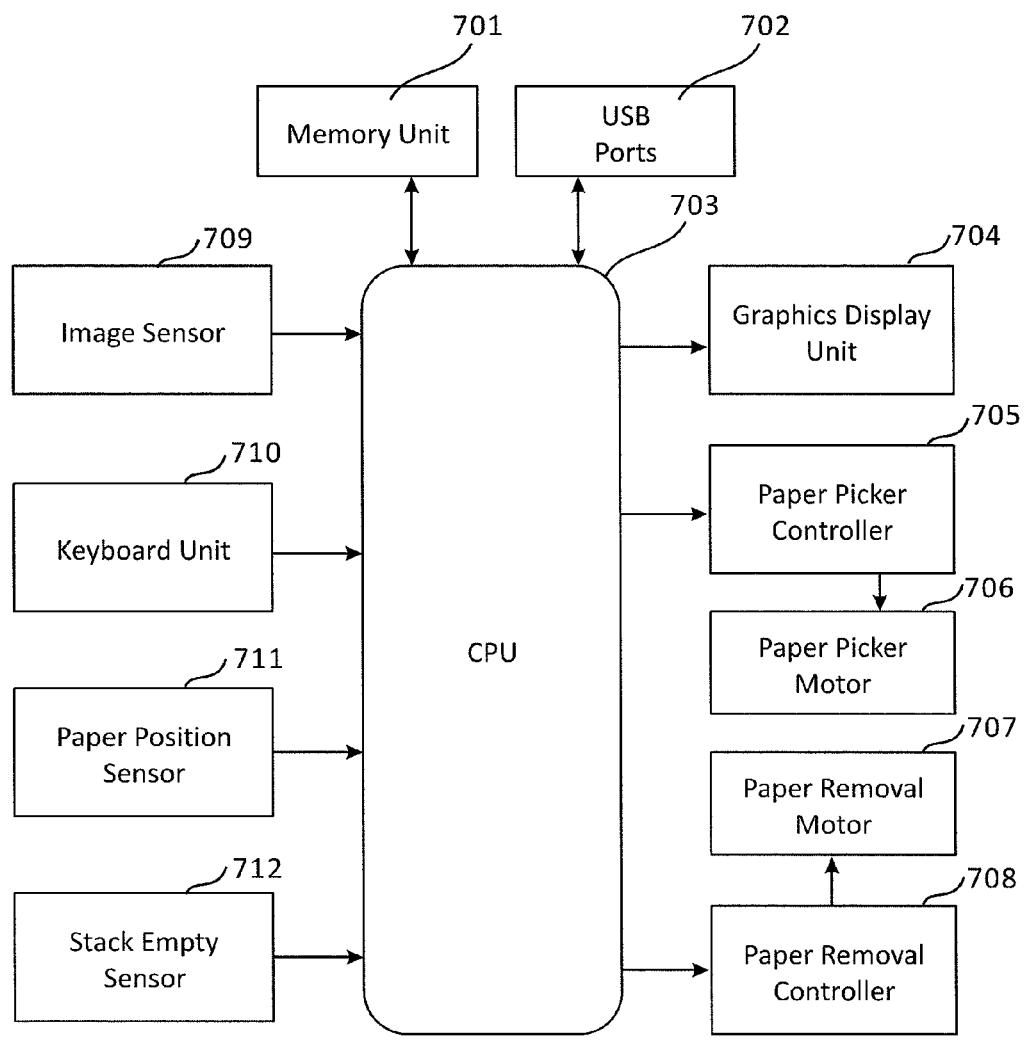
FIG. 6 is an embodiment of the document camera device's electronic control system.

FIG. 6 is one embodiment of the electronic control system that can execute the necessary logic processing in software and electronic circuits. These components can be implemented on one or more Printed Circuit Boards, which can be housed inside the CCU 307 and the swing arm unit 305. Central Processing Unit (CPU) 703 processes a series of computational functions, including: a) the format encoding and transcoding of a captured bitmap image; b) image file compression such as compression in JPEG or Motion JPEG formats; c) implementation and execution of USB high speed data communication protocol; d) receiving resulting signals of Paper Position Sensor (PPS) 711 and Stack Empty Sensor (SES) 712, and processing subsequent actions in response to these sensor signals; e) performing User Interface functionalities by receiving user inputs from a keyboard unit 710 while computing and producing data for the graphics display unit 704; and f) general logic processing and computations.

The Memory Unit (MU) 701 is responsible for: a) storing or caching intermediate results of various computations by the CPU 703; b) saving image compression result data; c) storing and relaying the stream of data communication between the CPU 703 and the USB Ports (USB) 702. Image Sensor (IS) 709 is responsible for converting optical images into digital information in forms of image bitmaps as still images or PCMs for real time video stream. Keyboard Unit (KBU) 710 captures user inputs and user feedback to system displays through buttons and the accompanying electronic circuitry. Paper Position Sensor (PPS) 711 signals the CPU the current position of a sheet of paper in the process of being removed from the PTU 302 and whether it is completely removed. The mechanism used to sense the position of a sheet of paper is a light beam, infrared for example, that is sent out toward a receiver at or near the static paper tray unit. When paper is in the path of the light beam, no light will pass through from the light emitter to the light beam and the system can be programmed to capture an image. However, when paper completely passes through from the emitter to the beam, the system will know that a new sheet of paper needs to be placed on the static paper tray or the sheet of paper needs to be adjusted. Stack Empty Sensor (SES) 712 signals the CPU 703 whether the paper stack placed in PTU 302 is emptied. USB Ports (USB) 702 a) transfer encoded still image or video stream data to a host computer; b) relay control signals and status data from the apparatus to a host computer; c) relay control signals and status data from a host computer to the apparatus. Graphics Display Unit (GDU) 704 receives information from the CPU 703 such as system status, system function selection menu, and confirms user selection inputs. Paper Picker Controller (PPC) 705 is the electronic controller for moving and stopping, the speed of the motions of motorized mover system 504. Paper Picker Motor (PPM) 706 receives control signals from PPC 705 and is the actual motor which actuates motion of the motorized mover system 504. The paper removal controller 708 is the electronic controller for signaling the starting, stopping, and speed of the Paper Remover Motor (PRM) 707, which in turn actuates and stops the motion of motorized paper mover lids 506 in FIGS. 4a and 4b, also illustrated as paper removal roller and belt unit 606 in FIG. 5.

Figure 7:
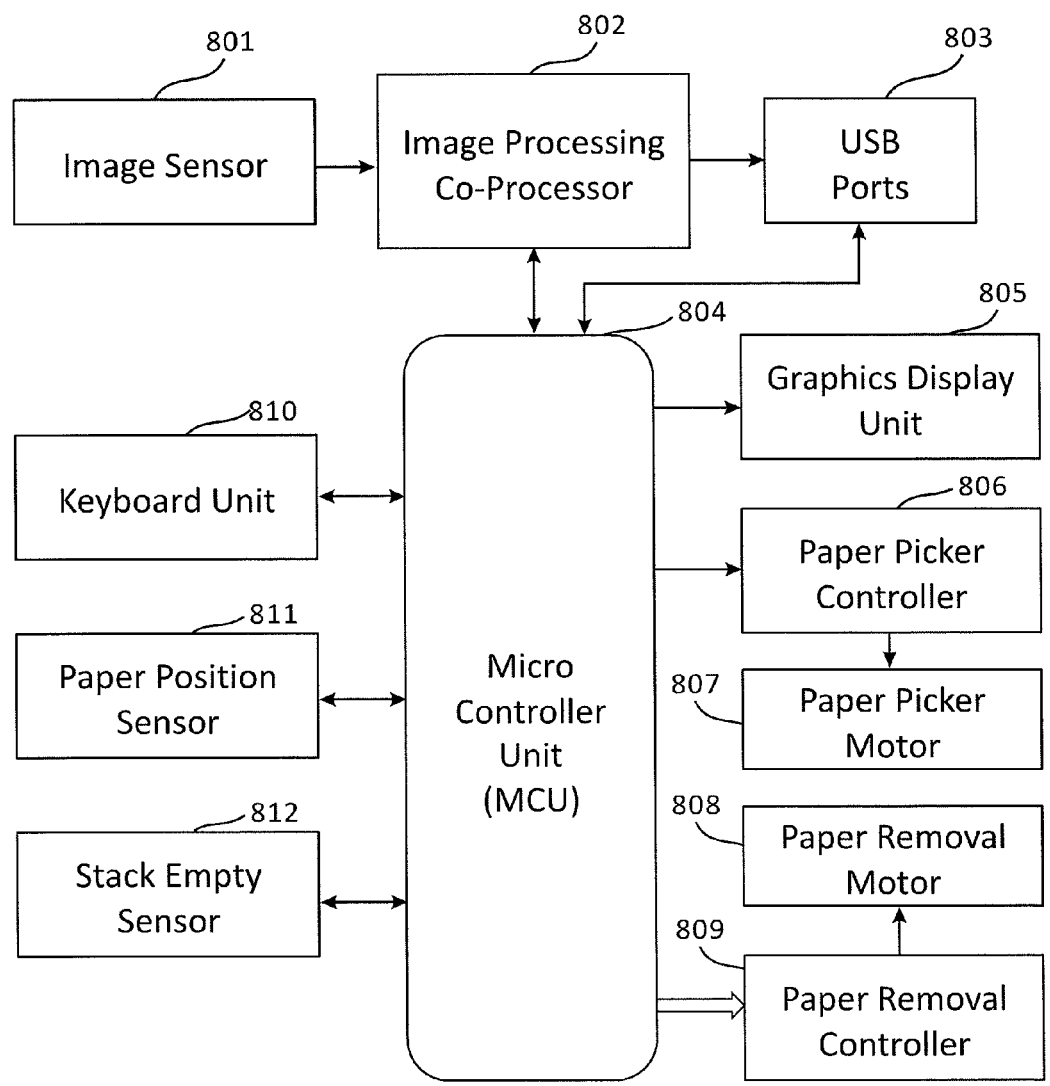
FIG. 7 is another embodiment of the document camera device's electronic control system.

FIG. 7 is an alternative embodiment of the electronics control and image processing system for the apparatus, based on a Micro Controller Unit (MCU) 804 chip. In this embodiment, the CPU 703 is replaced by a MCU 804 in junction with an Image Processing Co-Processor (IPCP) 802. The MCU 804 processes a number of control functions, including: a) implementation and execution of the USB high speed data communication protocol in communicating with the USB Ports (USB) 803; b) receiving result signals of Paper Position Sensor (PPS) 811 and Stack Empty Sensor (SES) 812, and processing subsequent actions in response to these sensor signals; c) performing User Interface functionalities by receiving user inputs from the Keyboard Unit (KU) 810 while computing and producing data for the Graphics Display Unit (GDU) 805; and d) general logic processing and computations. IPCP 802 processes functions including: a) format encoding and transcoding of a captured bitmap image; b) image file compression such as compression in JPEG or Motion JPEG formats; c) implementation and execution of the USB high speed data communication protocol; d) signaling MCU 804 for image processing status; and e) executing instructions received from MCU 804. All other components in FIG. 7 correspond to identical parts in FIG. 6 and have identical functions. The only exception is USB 803 not only communicates with MCU 804 but also communicates with IPCP 802 in this embodiment.

To operate the disclosed embodiments, a the user presses a button or clicks on a control icon implemented in software running on an accompanying PC, sending a signal to the Central Control Unit (CCU) 307 thereby initiating the whole process of automatic capturing of images for the paper stack. The DSCU 304 is sent a signal to capture a still image of the top sheet of paper on the stack. The captured image is sent to a personal computing device via high speed data communications link for storage or processing. As soon as the DSCU 304 finishes the image capturing action, the motorized paper unloading assembly 301 receives a signal to move in a sliding and swinging motion from a position that was outside of the field of view of the DSCU 304 to position itself above the top sheet of paper. Through a suction force created by a minimum of one suction fan mounted outside of a suction picker housing 402, the motorized paper unloading assembly lifts up the top sheet of paper, and moves it laterally out through a set of Paper Remover Rollers 404, eventually reach the receiving paper tray 406. In an alternative embodiment, a roller assembly can be employed in place of the Suction Picker mechanism in the MPUA 301. The gears and rollers as part of the MPUA are actuated to cause the rollers to rotate and cause the top sheet of paper to be moved to the outside of the static paper tray unit 302. Once the top sheet of paper is removed from the paper stack, an optical sensor unit senses the completion of the removal action, and sends a signal to the CCU 307 to initiate the sliding motion of the MPUA 301 to move back to its hidden location to clear the field of view for the DSCU 304. The sequence of action repeats until the image of last sheet of paper on the stack is captured and removed from the SPTU 302.

Unlike a prior art image capturing device, when a document camera-scanner is deployed as the primary image capturing device from a facing-down suspended position, the batch scanning of multiple pages of documents can be accomplished by simply removing the top sheet of paper from the stack of originals placed inside the paper tray within the MPUA 301. After a still image is captured for that top sheet, the image capturing and paper removal actions and automatically repeated until the whole stack of paper is processed and removed from the paper tray. In this novel approach for batch scanning multiple sheets of paper, there is no need for automatic or motorized paper loading gear assembly, and there is no need to consider paper jam prevention in subsequent transportation of paper while being pulled through a scanning mechanism, and there is no need to limit the speed of paper movement inside any complex and elaborate motorized gear and roller assembly. The removal of one sheet of paper at a time from a stack of paper is a significantly simpler and more straight forward process in comparison to the traditional paper feeding methods used in prior art devices.

When the digital document camera-scanner resolution increases to 5 mega pixel, 8 mega pixel, 10 mega pixel, or even 30 mega pixel levels, captured document images can reach clarity of 300 dpi to beyond 600 dpi level. This overcomes the problem of significant scan time delay experienced in prior art scanner devices. As an illustrative example, the traditional scan time delay for scanning a 48-bit color image of an 8.5"×11" document at 600 dpi can take between 30 to 60 seconds or more in certain commercially available scanner product today. The time required to scan the same document with 48-bit color, at approximately 600 dpi resolution with a 10 mega pixel DSCU 304 described in this invention is less than 100 ms. Such time saving is highly significant, and makes scan time a non-factor regardless of dpi resolution or color depth of the captured images. The preferred embodiment of the presentation also adjusts to variable sized paper. the MPUA 301 employs a suction picker housing unit or a roller based unloading unit, which spans across the entire width of the static paper tray unit (SPTU) 302, while the DSCU 304 adjusts its position vertically and horizontally to center and zoom in onto variable sized paper objects, which result in the capability of digitally photographing and properly removing any sized paper using this mechanism.

Figure 8:
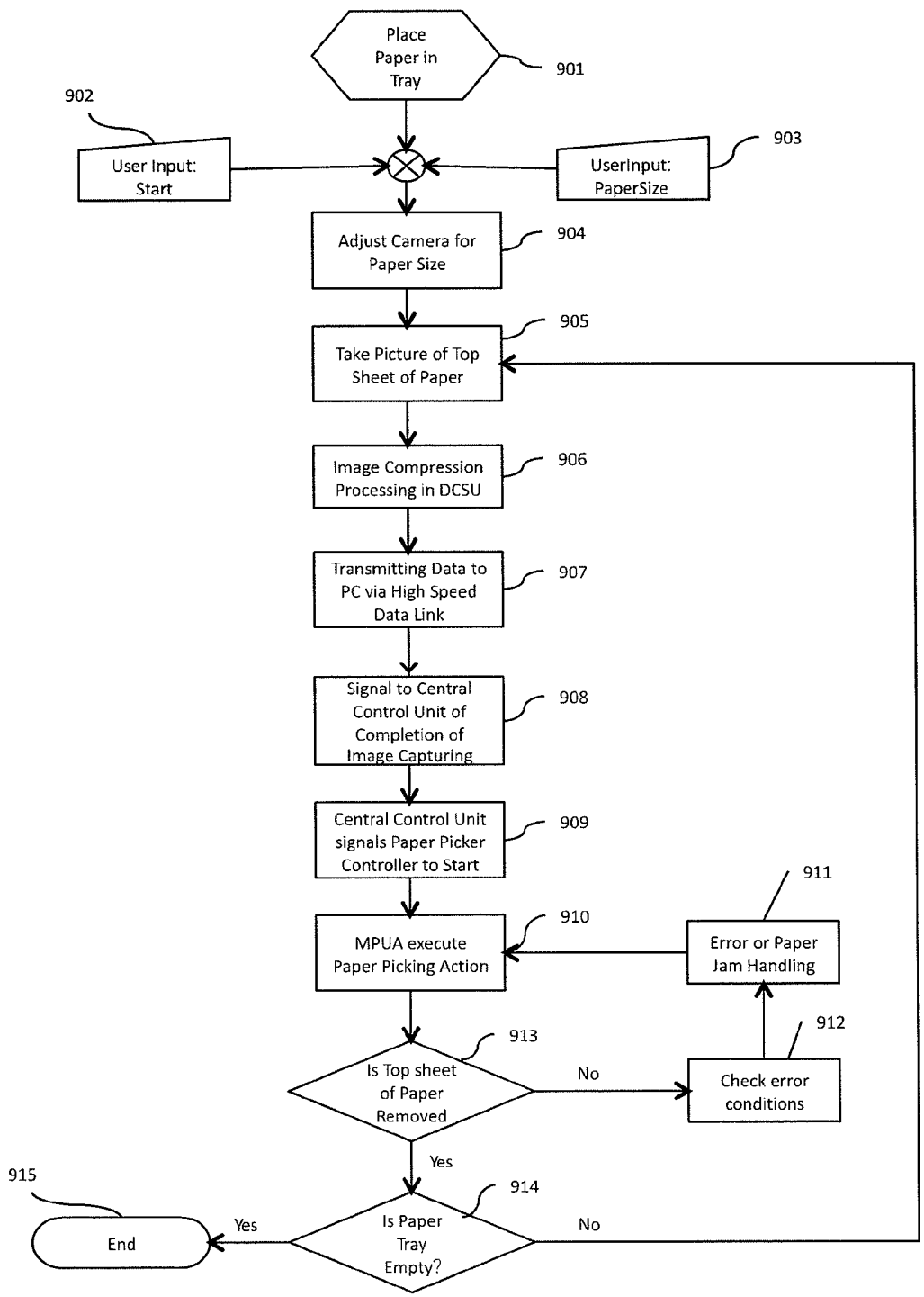
FIG. 8 illustrates methods for operating the apparatus in a logic flow diagram.

FIG. 8 illustrates the methods for operating the apparatus in a logic flow diagram. At 901, a user places a stack of paper with a minimum of one sheet of paper in the SPTU 302. The user then inputs the paper size information into the system at Step 903, and inputs a "start" instruction through the keyboard unit 710 or 810. At step 904, the apparatus adjusts the vertical position of DSCU 304 to zoom in on the paper surface as much as possible to achieve the highest possible resolution. If the paper size is a standard size known to the apparatus, the DSCU 304 will move to predetermined corresponding positions vertically to achieve optimal resolution. The DSCU 304 also moves horizontally so that the camera lens is always placed straight on top of the center of the paper surface according to the user selected paper size. At Step 905, the DSCU 304 takes a digital picture of the top sheet of paper and creates a bitmap image data file. At Step 906, the captured bitmap image data is encoded and compressed by the IPCP 802 or is temporarily stored in the Memory Unit 701 and later encoded and compressed by the CPU 703. At Step 907, the electronic control and imaging system transmits captured and compressed images to a host computer (PC) via a high speed data link like the USB 702 or 803. At Step 908, once the transmission of the image data file to the host computer is complete, the CPU receives the status signal, and initiates the next stage of action control within the CCU 307. At the next Step 909, the CPU 703 or MCU 804 instructs the PPC 705 or 806 to initiate the motion sequence in picking up and removing the top sheet of paper from the paper stack 507 or 607. At Step 910, the MPUA 301 executes the picking and removal action.

At Step 913, the CPU 703 receives a signal from the paper position sensor 711 regarding the paper removal status; or in the alternative embodiment, the MCU 804 receives a status signal from paper position sensor 811. If the paper is not successfully removed, Step 912 and 911 are initiated to check for error conditions and process handling of the error condition or paper jam. At the end of Step 911, Step 910 maybe repeated for the apparatus to resume operation. If the paper is successfully removed, the CPU 703 or the MCU 804 checks for stack empty sensor 712 or 812 stack emptied status, if the stack is not emptied, the process loops back to Step 905 for the image capturing for the next sheet of paper on the top of the stack, and followed by subsequent removal of that sheet of paper. If the stack is emptied at this point, the entire process ends.

Figure 9:
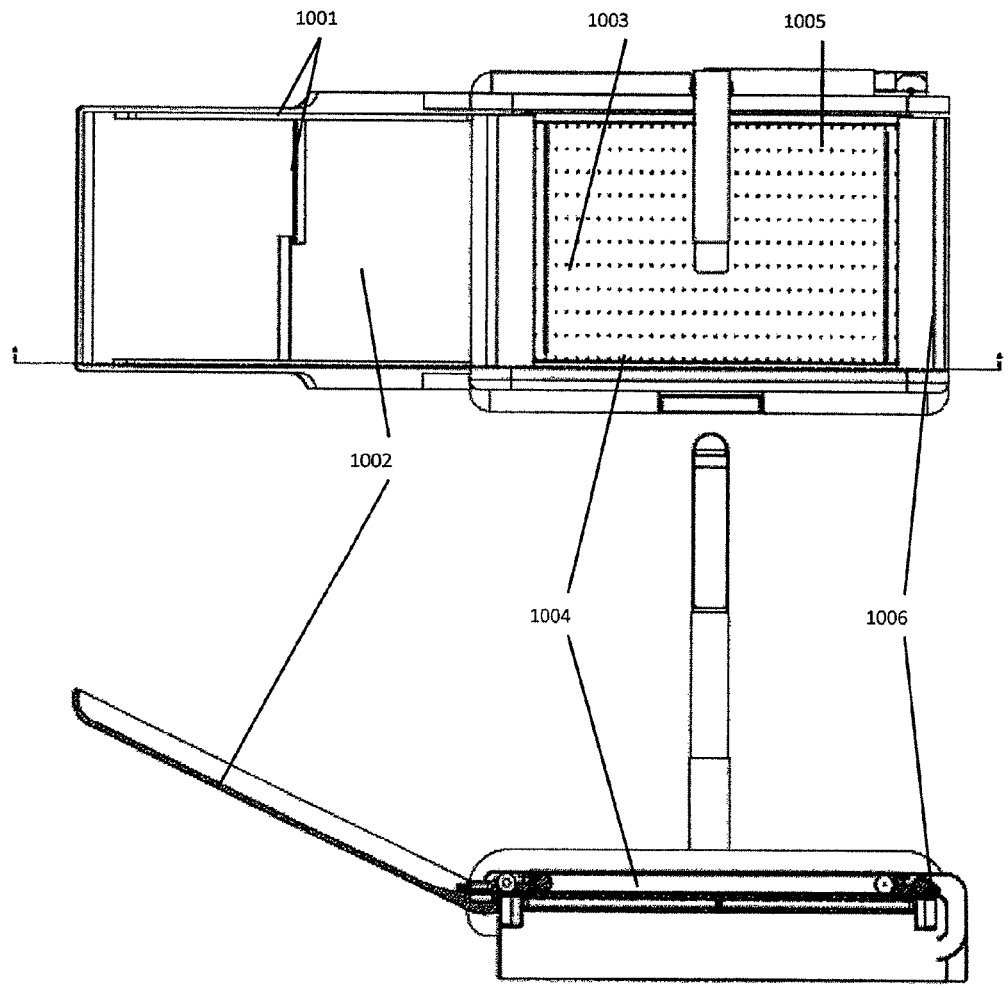
FIG. 9 illustrates another embodiment of the document camera device.

FIG. 9 illustrates another possible embodiment using a more conventional configuration for placing the paper stack into the apparatus. In this embodiment, a paper tray unit cover 1002 can be swung open from a position overlying the static paper tray to rest in a slanted downward angle and serve as a paper loading tray. Paper Size Adjustment Lever (PSAL) 1001 adjusts a width of the paper loading tray 1002 to fit any sized paper within, and signals a central control unit (CCU) of the paper size. The central control unit signals the paper moving belt assembly (PMBA) 1004 to move inward to the center region so that paper will be secured underneath PMBA 1004 and on top of a vacuum table 1003. A sheet of paper is removed from the bottom of the paper loading tray unit 1002, transported to the vacuum table 1003, and then stopped so that DSCU 301 can take a snapshot image of the top side of the paper surface, before the paper is moved away to the right side of the vacuum table through a finished paper chute into a receiving paper tray. Suction holes 1005 in the vacuum table help secure a sheet of paper firmly against the vacuum table. Paper removal roller assembly 1006 transports finished paper sheets through the finished paper chute.

Figure 10:
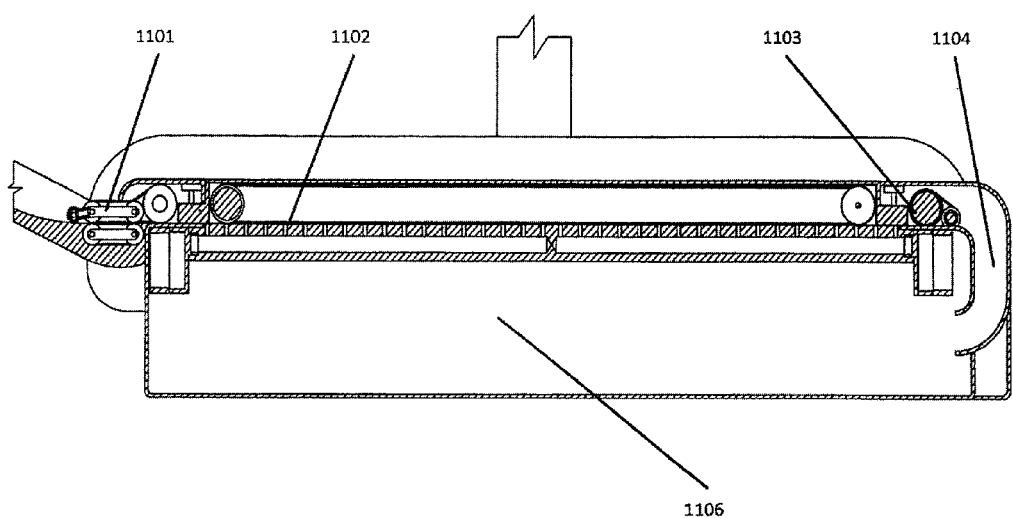
FIG. 10 is cross-sectional view of the embodiment illustrated in FIG. 10.

FIG. 10 is a cross sectional view of the embodiment illustrated in FIG. 9. It shows the detailed view of paper loading roller assembly 1101, paper moving belt 1102, paper removal roller assembly 1103, finished paper chute 1104, and receiving paper tray 1106 for depositing scanned in paper sheets.

Figure 11:
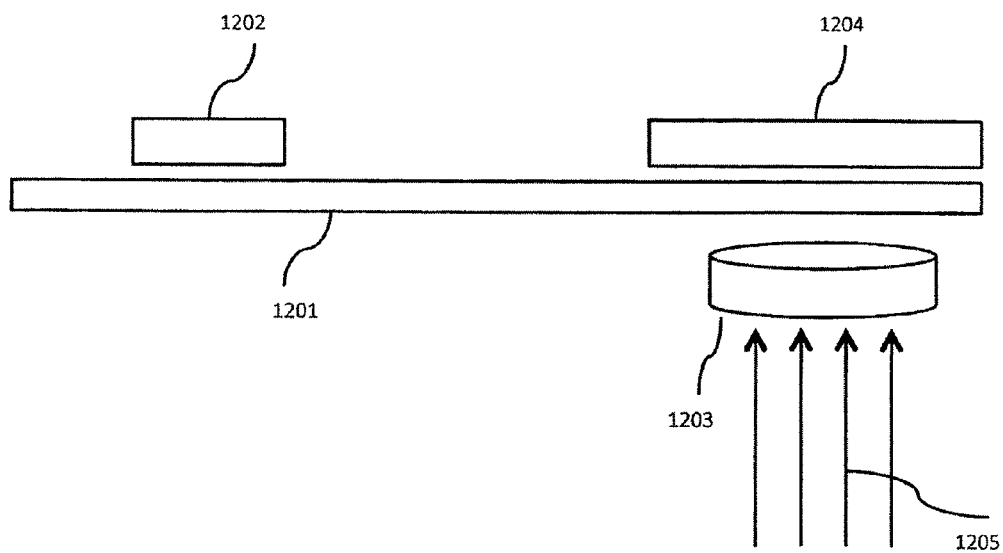
FIG. 11 is an illustration of the internal configuration of the apparatus's imaging electronic and optical components.

FIG. 11 illustrates the internal configuration of the DSCU 301's imaging electronic and optical components. Below printed circuit board (PCB) 1201 is optical lens 1203. Above it is the imaging sensor chip 1204. Images are captured when light 1205 is reflected through the lens 1203 onto the imaging sensor surface 1204.

With further reference to FIG. 2, an optional facsimile device is integrated into the embodiment 100. Connectors 209, 210 and 211, respectively, connect the integrated Ethernet, USB and facsimile modules of the apparatus to a regular telephone line for sending and receiving faxes.

Electronic mail software and other software programs that can transmit data over TCP/IP networks can execute within such an environment. Digital images captured by the document camera unit can be stored and managed locally, and can be also transmitted via email, uploaded to web sites, or any other utility that can transport image files over IP networks. There are numerous online electronic faxing service establishments over IP networks. Once the apparatus is connected to an IP network, users can link directly with any online electronic faxing service of their choice to send and receive faxes digitally. Such functionality can be considered as the apparatus being a virtual fax machine.

When one or more images are captured into the RAM of DSC-CCU 104, the image(s) are transferred to the fax module, which can then be transmitted via the connection 211 through a telephone line. For incoming fax transmission, the fax module receives fax images and then transfers to the DSC-CCU 104, which will instruct the integrated printer module to print out copies so that the user can obtain paper fax copies. Alternatively, the received fax can be stored in the internal storage of the apparatus or be transferred to the host computer for viewing or management. In this embodiment, the pull out DSC-CCU 104 also includes electronic components, which supports TCP/IP network connectivity. This allows for the apparatus to transmit or receive images directly over the internet as an independent and fully functioning computer, which can allow images to be sent and received via email application software embedded in the apparatus or send or receive images via electronic or often referred to as virtual fax services offered on various web sites.

Figure 12:
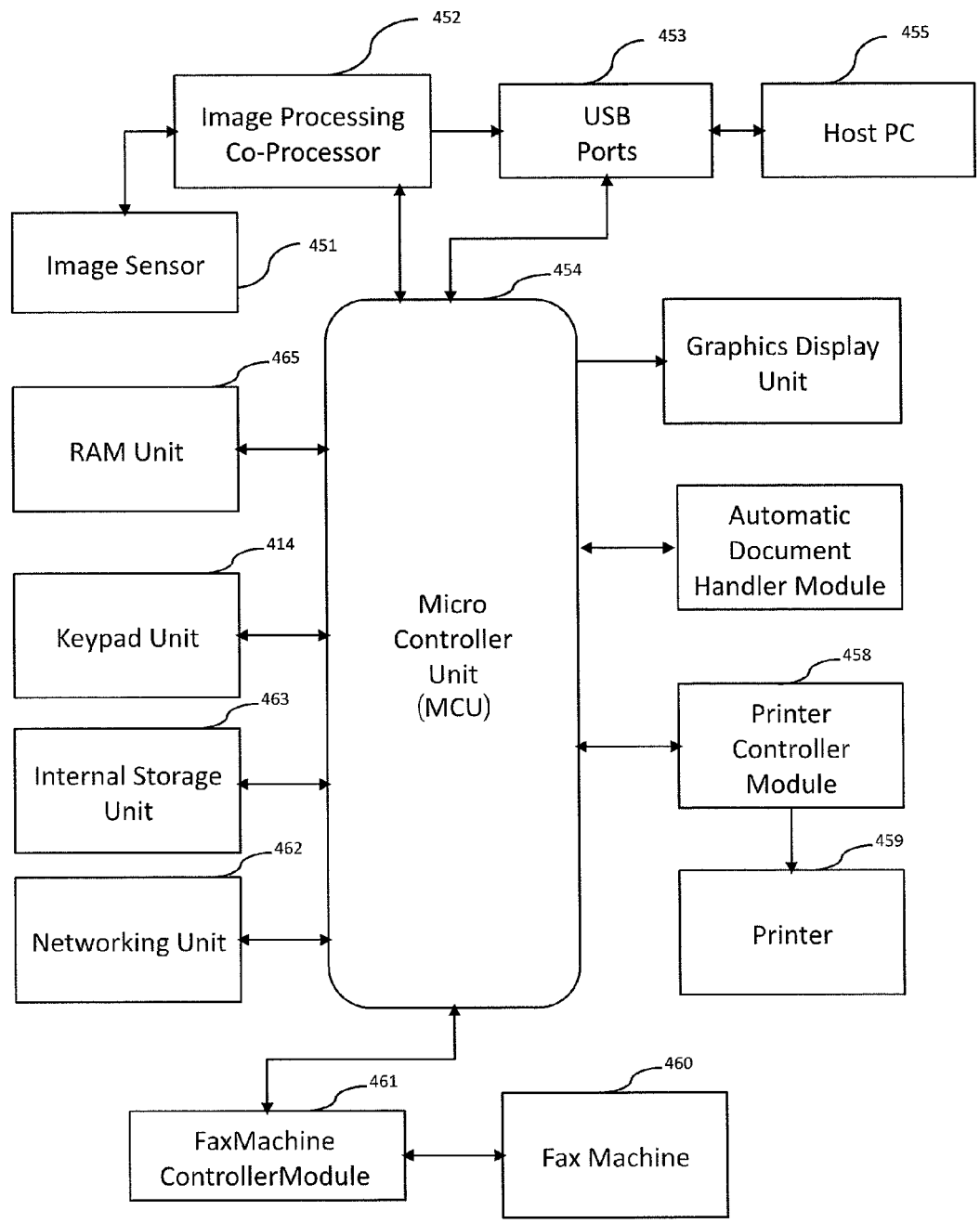
FIG. 12 is another embodiment of the electronic control components of the document camera device.

FIG. 12 is the diagram of the entire electronic control components in a preferred embodiment. The central control unit is the Micro Controller Unit (MCU) 454, which receives data from supporting components of the apparatus, computes, and sends out control instructions or transfer data to the supporting components of the apparatus. For image capturing and processing, instructions are sent from the MCU 454 to DCSU 107 so that image is captured by the Image Sensor 451, and subsequently processed by Image Processing Co-Processor (IPCP) 452, which encodes and compresses images. The Images can be transmitted through the USB Ports 453 to a Host PC 455, or stored temporarily within the RAM Unit 465, or be stored within the Internal Storage Unit (ISU) 463, or transmitted via the Network Unit 462 to other computers or devices connected via TCP/IP network on the internet.

For copier and printer functions, the MCU 454 will instruct and transfer data for captured images to the Printer Controller Module (PCM) 458 and through certain Printer Driver software which will enable the Printer 459 to produce physical printed copies of these images. For faxing functions, the MCU 454 will instruct and transfer data for captured images to the Fax Machine Controller Module (FMCM) 461 which will enable the Fax Machine 460 to send the images out to a receiving fax machine connected via a telephone line. For receiving faxes, the Fax Machine 410 will receive an incoming image, which it will transfer to the MCU 454 for processing via the FMCM 461. The MCU 454 will subsequently instruct and transfer data to the Printer 459 via PCM 458 to print out a paper copy of the incoming fax.

Figure 13:
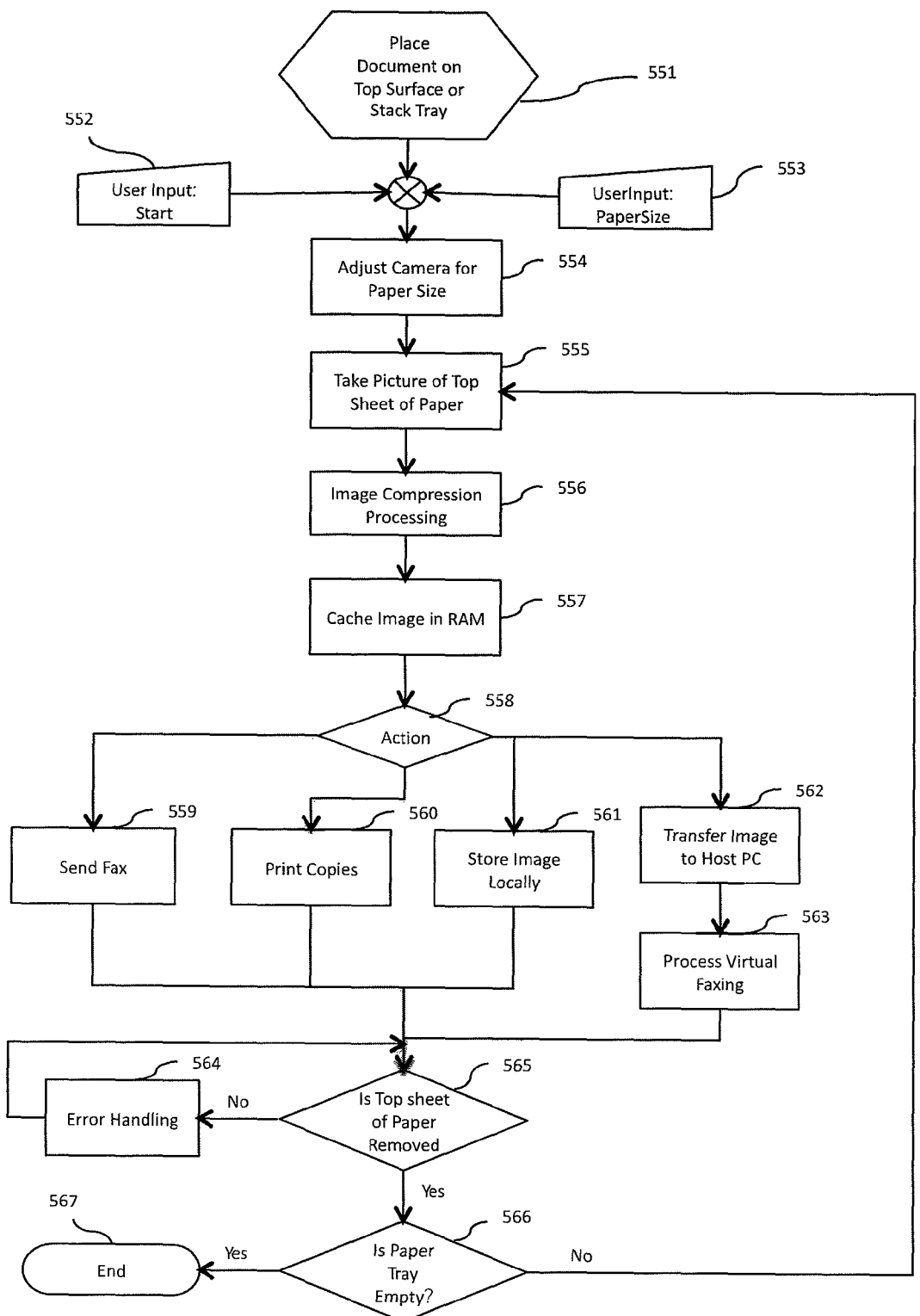
FIG. 13 illustrates an operation procedure and internal system processing logic flow.

FIG. 13 illustrates an operation procedure and internal system processing logic flow in a flow chart. At a first Step 551, a user places one sheet of document on the top cover or a stack of paper into the SPTU 207 for the apparatus to scan, copy, or fax. At Step 553, a user inputs paper size information into the apparatus through either a keypad unit or through a touch sensitive display unit. At Step 552, a user presses a control button to start the processing sequence, along with further intention information such as whether to copy, scan, or fax. At Step 554, the apparatus adjusts the DCSU 107 by moving it up or down to a predetermined vertical position on the document camera stand 102 according to the user imputed paper size; it also moves the DCSU 107 with the document camera stand 102 laterally along a guiding rail structure to position the camera's lens in the center of the paper document.

At Step 555, the DCSU 107 is instructed to capture a digital snapshot image of the top sheet of paper on the paper stack. At Step 556, the Image Processing Co-Processor encodes and compresses the captured digital image. At Step 557, the encoded and compressed digital image is stored in RAM memory awaiting further action.

At Step 558, the system performs logic switching based on the user's earlier input. If the user's earlier input was to send a fax, the apparatus performs fax sending at Step 559. If the user's earlier input was to make copies of the original document(s), the apparatus performs printing function of one or more pages of the captured image of the original(s) at Step 560. If the user's earlier input was to scan to local storage, the apparatus performs a storage processing of the captured image(s) into a Local Storage Unit at Step 561. If the user's earlier input was to scan to a Host PC, the apparatus performs the necessary processing to transfer the captured digital image(s) to a Host PC via USB Ports or via IP network connections at Step 562. Further, on the Host PC, a software program may execute faxing of the captured image via electronic fax services (also can be referred to as virtual faxing) at Step 563.

At Step 565, the apparatus checks the status data of a paper position sensor to detect whether the top sheet paper is successfully removed from the paper stack and completely transported out. If the status is not successful, the apparatus performs Error Handling processing, such as removing paper jams, at Step 564. If the status is successful, then the apparatus proceeds to the next step.

At Step 566, the apparatus further checks the paper position sensor to determine whether the paper stack is emptied completely. If not, the apparatus loops its processing sequence back to Step 555 to repeat the process until the SPTU 207 is completely emptied. At Step 567, if the SPTU 207 is completely emptied and all images processed successfully, the entire process ends.

I claim:

1. A document imaging apparatus comprising:
   a housing containing a paper storage tray for statically retaining a plurality of sheets of paper therein;
   a digital image sensing device for capturing a bitmap image of one of the sheets of paper;
   an adjustable digital image sensing device stand supported by the housing and supporting the digital image sensing device;
   a document removal apparatus comprising a suction picker and a plurality of rollers, wherein the suction picker is configured to apply a suction force to a top surface of a single sheet of paper on top of the plurality of sheets of paper and is further configured to raise and remove the single sheet of paper from the stack of paper and transfer the single sheet of paper toward the plurality of rollers; and
   a suction picker mover for moving the suction picker, with the single sheet of paper, upward and laterally toward the plurality of rollers.

2. The document imaging apparatus as recited in claim 1 further comprising a paper position sensing unit for determining the position and readiness of a to-be scanned sheet of paper.

3. The document imaging apparatus as recited in claim 2 further comprising at least one of the units selected from the group of units consisting of: a fax unit, a photocopy production unit, and a print production unit.

4. The document imaging apparatus as recited in claim 1 wherein the digital image sensing device comprises an infinite length focal lens.

5. The document imaging apparatus as recited in claim 2 wherein the digital image sensing device is configured to capture a real-time video stream.

6. The document imaging apparatus as recited in claim 1, the digital image sensing device is adjustable in three dimensions.

7. The camera document imaging apparatus as recited in claim 1 further comprising a fan unit for creating a vacuum within the suction picker.

8. The camera document imaging apparatus as recited in claim 1 further comprising a pump unit for creating a vacuum within the suction picker.

* * * * *